United States Patent [19]

Matsukiyo et al.

[11] Patent Number: 5,707,549
[45] Date of Patent: Jan. 13, 1998

[54] PHOSPHOR, MANUFACTURING METHOD THEREFOR, AND CATHODE-RAY TUBE USING THE SAME

[75] Inventors: Hidetsugu Matsukiyo, Kawagoe; Masatoshi Shiiki, Musashimurayama, both of Japan

[73] Assignee: Hitachi Ltd., Tokyo, Japan

[21] Appl. No.: 571,237

[22] Filed: Dec. 12, 1995

[30] Foreign Application Priority Data

Dec. 19, 1994 [JP] Japan .................................. 6-314389

[51] Int. Cl.$^6$ .......................... H01J 29/20; C09K 11/62; C09K 11/64
[52] U.S. Cl. .................. 252/301.4 R; 313/467; 313/468
[58] Field of Search ............. 252/301.4 R; 313/467, 313/468

[56] References Cited

U.S. PATENT DOCUMENTS 3,758,413   9/1973   Peters ........................... 252/301.4 F
5,363,013  11/1994   Matsukiyo et al. ................. 313/468

FOREIGN PATENT DOCUMENTS 57-105948   7/1982   Japan .
58-152350   9/1983   Japan ............................. 313/468
60-101175   6/1985   Japan .

OTHER PUBLICATIONS

"Abstract of 217th meeting (1987), Phosphor Research Society, Electrochemical Society of Japan, P. 19–26; Phospher for Projection Tube" No Month.

Primary Examiner—Melissa Bonner
Attorney, Agent, or Firm—Antonelli, Terry, Stout, & Kraus, LLP

[57] ABSTRACT

To provide a stable phosphor with a high brightness and little luminous degradation, a phosphor comprises yttrium, aluminum (a part or the whole of aluminum may be replaced with gallium), and oxygen as basic constituting elements, Tb or Ce as an activator, and the garnet structure as a crystal structure and in the curve 1-1 showing the temperature dependency of the thermoluminescence intensity, the integrated intensity of the thermoluminescence peak in the temperature range from 300K to 700K is made smaller than the integrated intensity of the thermoluminescence peak in the temperature range of less than 300K.

33 Claims, 4 Drawing Sheets

FIG. 1

1-1 PRESENT INVENTION
1-2 REFERENCE EXAMPLE

FIG. 2

2-1  PRESENT INVENTION
2-2  REFERENCE EXAMPLE

PHOSPHOR, MANUFACTURING METHOD THEREFOR, AND CATHODE-RAY TUBE USING THE SAME

BACKGROUND OF THE INVENTION

The present invention relates to a phosphor having a superior light emitting characteristic, a manufacturing method therefor, and a cathode-ray tube using the phosphor.

A projection tube is well known as a cathode-ray tube used under excitation by a high density electron beam. The luminous screen of such a projection tube is strongly required to have characteristics such as a high luminous efficiency, a brightness which is faithfully proportional to the excitation strength within a desired range, that is, free of luminous saturation, no reduction in the luminous efficiency due to temperature rise of the phosphor film, and little successive change in the luminous efficiency, that is, a superior luminous life. Particularly recently, the electron beam diameter is made smaller to increase the excitation strength further so as to realize a high picture quality, and a cathode-ray tube is used to project not only dynamic pictures but also still pictures, and specially an improvement of the luminous life is a big technical problem. In projection type television, the green component takes charge of the greater part of the white luminance, so that the aforementioned characteristics are important in the green emitting material.

At present, in projection type television, europium activated yttrium oxide ($Y_2O_3$:Eu) is used as a red emitting phosphor and silver and aluminum activated zinc sulfide (ZnS:Ag, Al) is used as a blue emitting phosphor. On the other hand, as to a green emitting phosphor, as shown in "Abstract of 217th Meeting (1987), Phosphor Research Society, Electrochemical Society of Japan, p. 19–26; Phosphor for Projection Tube", various materials are under improvement even at present. Among them, the $Y_3(Al,Ga)_5O_{12}$:Tb system and the $Y_2SiO_5$:Tb system may be cited as two especially promising kinds of materials. The art on the former is disclosed in Japanese Patent Laid-Open 60-101175 and the art on the latter is disclosed in Japanese Patent Laid-Open 57-105948, and U.S. Pat. No. 3,758,413, etc.

There is a problem imposed that the aforementioned prior arts do not satisfy all the aforementioned required characteristics fully. For example, in a material of the $Y_3(Al,Ga)_5O_{12}$:Tb system, the luminescent color tone is slightly yellowish and the color reproduction range of a picture becomes narrower. Therefore, it is desirable to take a step of using a combination of a lens colored with a pigment and the projection tube, accordingly it is necessary to increase the excitation strength more, therefore a problem arises that it is necessary to lengthen the luminous life span. As to a material of the $Y_2SiO_5$:Tb system, a problem arises that the luminous degradation (deterioration) when a high density electron beam is irradiated to the phosphor film thereof is greater than that of a material of the $Y_3(Al,Ga)_5O_{12}$:Tb system.

SUMMARY OF THE INVENTION

An object of the present invention is to eliminate the difficulties of the prior arts mentioned above and to provide a stable phosphor with a high brightness and little luminous degradation. Another object of the present invention is to provide a method for manufacturing such a phosphor. Still another object of the present invention is to provide a cathode-ray tube having a stable luminous screen with a high brightness and little luminous degradation.

To accomplish the first object mentioned above, the phosphor of the present invention comprises aluminum and/or gallium, yttrium, and oxygen as basic constituting elements added with terbium ions or cerium ions as an emission center and has a garnet type crystal structure and is structured so that in a curve showing the temperature dependency of the thermoluminescence intensity, the integrated intensity of the thermoluminescence peak in the temperature range from 300K to 700K is smaller than the integrated intensity of the thermoluminescence peak in the temperature range of less than 300K.

The aforementioned phosphor of the present invention is added with terbium ions or cerium ions as an emission center, so that it becomes a green emitting phosphor.

The aforementioned phosphor of the present invention can be expressed, for example, by a general formula as indicated below and it is a green emitting phosphor with a luminescent color of CIE chromaticity coordinates of $0.300 \leq x \leq 0.360$ and $0.540 \leq y \leq 0.625$.

$$(Y_{1-x-a-b}Tb_xM_aM'_b)_3(Al_{1-y}Ga_y)_5O_{12} \quad (1)$$

where M indicates at least one rare earth element selected from the group consisting of all of the 4f-type rare earth elements other than Tb, and M' indicates at least one element which is selected from Eu, Sm, Yb, and Tm, and $0.01 \leq x \leq 0.15$, and $0 \leq y \leq 1$, and $1 \times 10^{-4} \leq a \leq 0.5$, and $1 \times 10^{-6} \leq b \leq 2 \times 10^{-2}$.

Even if the value of a is less than $1 \times 10^{-4}$ or the value of b is less than $1 \times 10^{-6}$, it is not harmful. The upper limit of b is $3 \times 10^{-4}$ for $Eu^{3+}$, $1 \times 10^{-3}$ for $Sm^{3+}$ and/or $Tm^{3+}$, and $2 \times 10^{-2}$ for $Yb^{3+}$. Therefore, it is desirable that the value of b is generally less than or equal to $2 \times 10^{-2}$ and the luminescent color is within the aforementioned ranges of the CIE chromaticity coordinates. The value of a mentioned above is, for example, disclosed in U.S. Pat. No. 4,757,232 and the value of b mentioned above is disclosed in U.S. Pat. No. 5,177,401.

As mentioned above, Tb in the aforementioned general formula can be replaced with Ce.

The phosphor of the present invention expressed by Formula (1) indicated above may be expressed typically by the following general formula.

$$(Y_{1-x}Tb_x)_3(Al_{1-y}Ga_y)_5O_{12} \quad (2)$$

where the ranges of x and y are shown by $0.01 \leq x \leq 0.15$ and $0 \leq y \leq 1$, respectively.

A phosphor having the composition shown by the above general formula (2) has a garnet type crystal structure and emits green in the aforementioned CIE chromaticity coordinates. Tb in Formula (2) can be replaced with Ce.

In any phosphor, it is desirable that the integrated intensity of the thermoluminescence peak in the temperature range from 300K to 700K is at most 1/10 of the integrated intensity of the thermoluminescence peak in the temperature range of less than 300K and at most 1/100 is more desirable.

Furthermore, to accomplish the second object, the first manufacturing method of the phosphor of the present invention which is expressed by the general formula (2) comprises the steps of (1) oxidizing the raw materials of the phosphor containing yttrium, aluminum (a part or the whole of aluminum may be replaced with gallium), and terbium together with flux, (2) removing flux, and (3) oxidizing the obtained product so as to reduce the defect level in the phosphor.

As a "step of reducing the defect level in the phosphor crystal" indicated in Step (3) mentioned above, there can be cited typically the step of oxidizing the product obtained at Step (2) under the condition that undesirable monovalent gallium ($Ga^+$) in the phosphor crystal is oxidized to desirable trivalent gallium ($Ga^{3+}$). In this case, it is assumed that gallium is always contained.

The aforementioned flux is added so as to promote growth of crystal of the phosphor and to promote uniform diffusion of the emission center into the crystal and barium fluoride $BaF_2$ is generally best known and used as phosphor composition. Other than barium fluoride, strontium fluoride $SrF_2$ and yttrium fluoride $YF_3$ are known. The additional amount of flux varies with the conditions including the kind of flux to be used and the composition temperature. In the case of the conventional composition of the phosphor, 5 to 50 mol % is used generally. Also in the present invention, the additional amount of flux is 5 to 50 mol %. When the additional amount is closer to 50 mol %, the brightness is higher.

In the aforementioned manufacturing method, it is desirable that the oxidation at Step (1) mentioned above is executed in the air at a temperature within a range from 1400° to 1600° C. and more desirable that the oxidation is executed at a temperature within a range from 1500° to 1600° C. It is desirable that the oxidation at Step (3) mentioned above is executed in an oxygen atmosphere at a temperature within a range from 1000° to 1400° C. and more desirable that the oxidation is executed at a temperature within a range from 1200° to 1300° C.

The time of the oxidation described at each of Steps (1) and (3) is at least one hour and desirably one to three hours. When the oxidation time exceeds one hour, the effect of the oxidation is likely to be saturated.

The composition of the raw materials of the phosphor at Step (1) mentioned above may be assumed as that expressed by the general formula (2).

The manufacturing method of the present invention for the phosphor expressed by the general formula (2) may be a second manufacturing method which will be described next in addition to the aforementioned first manufacturing method. Namely, the materials of the phosphor containing yttrium and aluminum (a part or the whole of aluminum may be replaced with gallium) are oxidized together with flux, and a material of an element which will be an emission center is added to the obtained product, and they are heat-treated so as remove the flux.

In this manufacturing method, it is desirable that the oxidation is executed in an oxygen atmosphere at a temperature within a range from 1400° to 1600° C. and more desirable that the oxidation is executed at a temperature within a range from 1500° to 1600° C. It is desirable that the heat treatment is executed in the air at a temperature within a range from 1400° to 1600° C. and more desirable that the heat treatment is executed at a temperature within a range from 1500° to 1600° C. The emission center may use terbium ions. When the emission center uses terbium ions, a green emitting phosphor is obtained.

The oxidation time and the heat treatment time mentioned above are at least one hour respectively and desirably one to three hours. When each processing time exceeds one hour, the effect of the processing is likey to be saturated. The materials of the phosphor in the oxidation process of the second manufacturing method correspond to Y, Al, and Ga of the phosphor expressed by the general formula (2). The material of the element which will be an emission center is Tb. The material to be used as flux and the addition amount thereof are the same as those in the first manufacturing method.

To form a phosphor matrix of the garnet structure in the aforementioned phosphor manufacturing method, solid reaction in a high temperature state of at least 1400° C. is necessary. On the other hand, at a synthesizing temperature of 1600° C. or more, particles grow excessively, in other words, sintering progresses excessively, so that they are hard to handle as powder. A synthesizing temperature of 1400° to 1600° C., particularly 1500° to 1600° C. is most suitable in view of the addition amount of flux.

In the aforementioned first manufacturing method, when the heat treatment temperature in an oxygen atmosphere at Step (3) is lower than 1000° C., the oxidation effect of $Ga^+$ is small and when the treatment temperature increases, the thermoluminescence peak intensity near the room temperature reduces. However, as the temperature rises, the coagulation of the phosphor progresses and additional diffusion thereof becomes unavoidable. When Tb is contained, it is oxidized and the phosphor enters a $Tb^{4+}$ coexisting state, which is very undesirable. Therefore, the upper limit is about 1400° C. and the optimum temperature range is from 1200° to 1300° C.

The heat treatment after the emission center is added in the aforementioned second manufacturing method is executed so as to diffuse the emission center and a high temperature state is desirable. However, it is desirable to execute the heat treatment in the air but not in an oxygen atmosphere so as to suppress oxidation of Tb as much as possible. The temperature range is the same as that for the aforementioned matrix crystal synthesis.

In the aforementioned phosphor manufacturing method of the present invention, a case that the emission center is Tb in the general formula (2) mentioned above is described. However, the same may be said with a case that the emission center is Ce or the general formula (1) is used. It can be allowed to contain a very small amount of unavoidable impurities in the composition.

Each phosphor manufacturing method of the present invention mentioned above has a step of containing $Tb^{3+}$ or $Ce^{3+}$ in a phosphor and a step of containing $Ga^{3+}$ in a phosphor (when Ga is a constituting element).

Furthermore, to accomplish the third object mentioned above, the cathode-ray tube of the present invention comprises a luminous screen having a phosphor film in which the phosphor of the present invention is installed on a substrate, concretely on a face plate and an electron gun for exciting the phosphor of the luminous screen. In the cathode-ray tube of the present invention, the constitution other than the above may use the prior art.

It is desirable that the phosphor of the luminous screen is a mixture of a phosphor with a mean particle diameter in volume (hereinafter referred to as a mean particle diameter) of 2 to 5 μm and a phosphor with a mean particle diameter of 9 to 15 μm. The reason is that the relative brightness increases. It is desirable that a phosphor with a mean particle diameter of 2 to 5 μm and a phosphor with a mean particle diameter of 9 to 15 μm are mixed within a range of 40 to 80 wt % and within a range from 60 to 20 wt %, respectively. A phosphor with a large mean particle diameter has a better relative brightness and a phosphor with a small mean particle diameter improves the characteristic of the film, so that mixing of the two realizes the characteristics of the two. Without mixing phosphors with different mean particle diameters like this, it is also possible to use a phosphor with one kind of optional mean particle diameter, for example, within a range from 2 to 15 μm. It is desirable that the filling density of the luminous screen is within a range from 2.2 to 3.0 g/cm$^3$.

When the addition amount of flux increases, the particle diameter of phosphor increases and when the synthesizing temperature rises, it also increases. An adjusted phosphor has a particle size distribution and various particle sizes, so that a phosphor having a desired particle diameter can be obtained by classification.

The aforementioned mean particle diameter in volume means a mean particle diameter which is defined by $(V/n)^{1/3}$ where n indicates the number of particles in the whole volume V and concretely a particle diameter which is measured by the known Coulter counter method which is a measuring method based on the Coulter's principle.

The existence of a defect level (trap) in the crystal takes part deeply in the light emitting characteristic of a phosphor and it is inferred that the degradation is caused by the defect level in the crystal. As to the depth of trap and the carrier density occupied in there, a method using thermoluminescence is well known from long ago. The thermoluminescence is a phenomenon that when the temperature of a sample rises after the excitation is stopped, electrons and positive holes which are captured by the trap are opened and emit light again by radiation and recombination in the emission center.

According to the present invention, the thermoluminescence intensity is measured at a fixed rate of temperature rise and a thermoluminescence curve (glow curve) expressed as a temperature function is a means for evaluation of the trap. A test piece is uniformly coated with a phosphor sample by coagulating sedimentation using water glass on an oxygen free copper nickel-plated substrate. By using phosphor films which are the same in amount and area, a relative comparison between samples can be made easily by this method. The coagulating sedimentation method using water glass is a very general phosphor film forming method and widely used as a phosphor film forming method for a projection tube at present. Water glass can be expressed, for example, by a general formula $K_2O \cdot nSiO_2$ and the value of n is often set to about 2.8.

The following procedure is used for measurement. (1) Ultraviolet light (wave length: 254 nm) is irradiated to a sample set in a cryostat at a low temperature of 80K for one hour and the trap is filled with carriers. (2) The irradiation of ultraviolet light is stopped and the sample is heated at the fixed rate of temperature rise (0.1K/s). (3) The sample temperature is monitored by a K-type thermocouple and the thermoluminescence is monitored by using a photomultiplier and the thermoluminescence intensity is plotted for the temperature. When the sample is heated to a little over 600K, infrared light or red visible light emitted from the heater is detected. Therefore, an interference filter for transmitting green close to the luminescence peak wave length of the phosphor is set in front of the photomultiplier for measurement.

When a thermoluminescence curve (glow curve) is measured, it is important to keep the rate of temperature rise constant. Particularly when glow curves between samples are compared, if they are measured at different rates of temperature rise, the thermoluminescence peak position is shifted or the thermoluminescence intensity is varied. Therefore, there is a rate of temperature rise as a so-called measurement constant of a measuring instrument and it is important to measure all samples to be compared under the same condition. The data shown in this specification is obtained by using only a rate of temperature rise of 0.1K/s.

Figure 1:
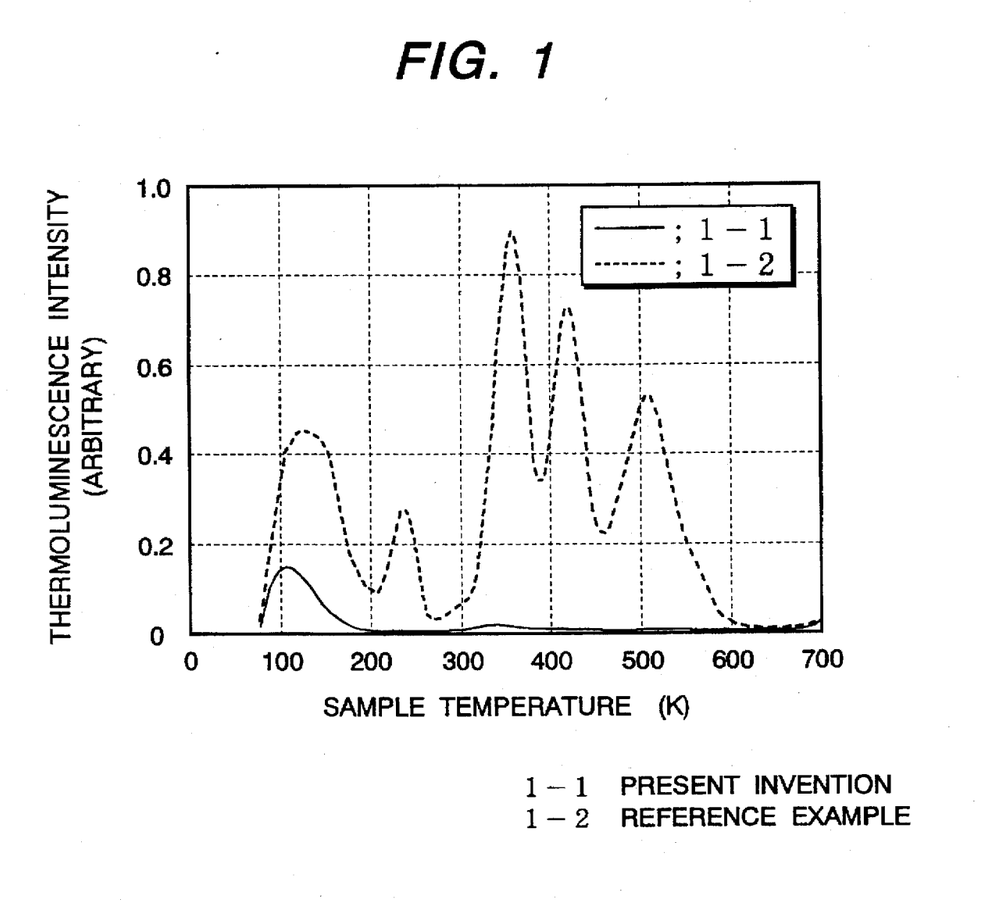
FIG. 1 shows graphs showing the temperature dependency of the thermoluminescence intensity (glow curves) of the phosphor obtained by the present invention.

For simplicity of explanation, the glow curve of the phosphor described in Embodiment 18 which will be described later is shown in FIG. 1 and for comparison, the glow curve of the phosphor described in Reference Example 3 is also shown in FIG. 1 for explanation. In the sample of the reference example, a thermoluminescence peak is observed not only between 100K and 200K but also near 240K, 350K, 420K, and 510K. However, in the phosphor of the present invention, little thermoluminescence is observed at more than the room temperature. In this example, the integrated intensity of the thermoluminescence peak within a temperature range from 300K to 700K is less than $1/1000$ of the integrated intensity of the thermoluminescence peak within a temperature range of less than 300K. When the phosphor film is used at more than the room temperature, carriers in the trap observed in the low temperature portion of the glow curve are open, so that there is little probability of existence of carriers in the trap. Therefore, the effect of the shallow trap observed in the low temperature portion on the light emitting characteristic of the phosphor can be almost ignored.

Figure 2:
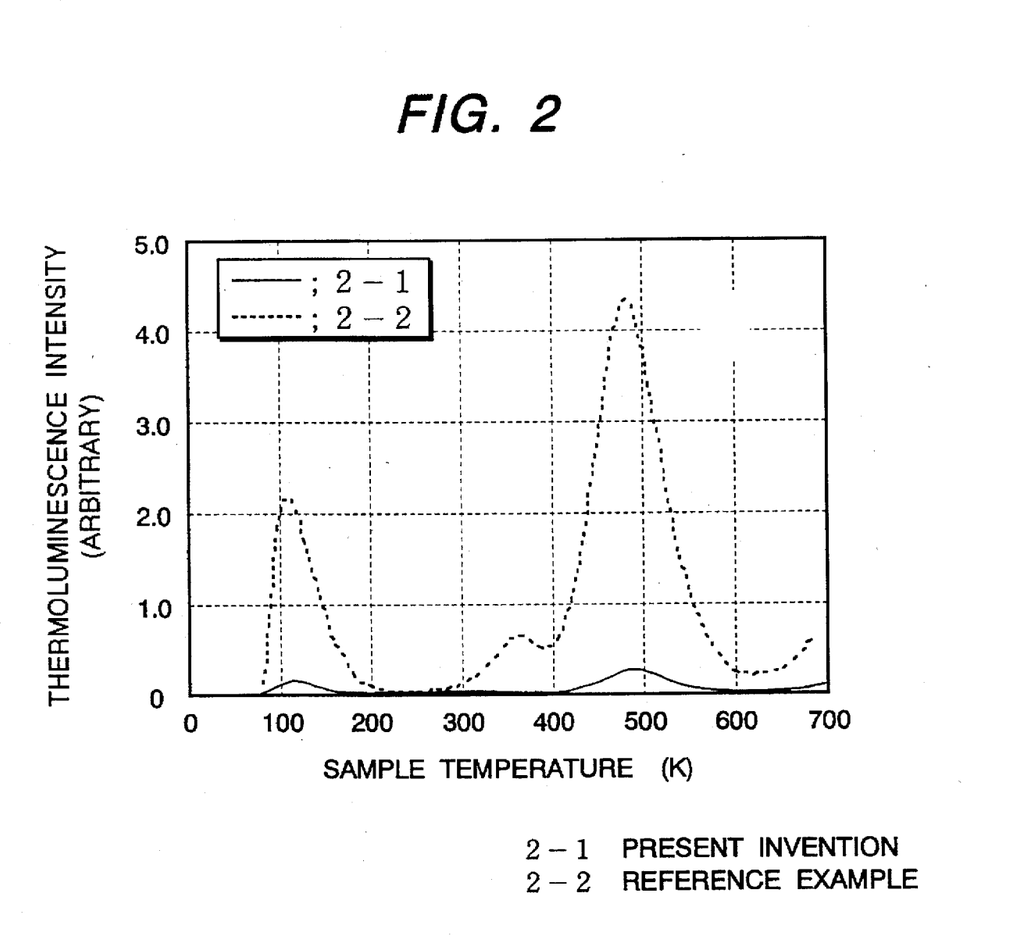
FIG. 2 shows graphs showing the temperature dependency of the thermoluminescence intensity (glow curves) of the phosphor obtained by the present invention after a high density electron beam is irradiated to it.

On the other hand, glow curves after a high density electron beam is irradiated to these phosphor films (the irradiation condition is shown in the embodiment which will be described later) are shown in FIG. 2. The thermoluminescence intensity is increased near 490K, whereas the integrated intensity of the phosphor of the present invention is very low. It is inferred that the peak near 490K is caused by the color center which will be a cause of luminous degradation. As mentioned above, in the phosphor of the present invention (Embodiment 18), little thermoluminescence is observed at more than the room temperature and very little color center is generated after irradiation of an electron beam, so that the efficiency is higher than that of the reference example by about 7% and the luminous life is improved by about 7%.

Figure 3:
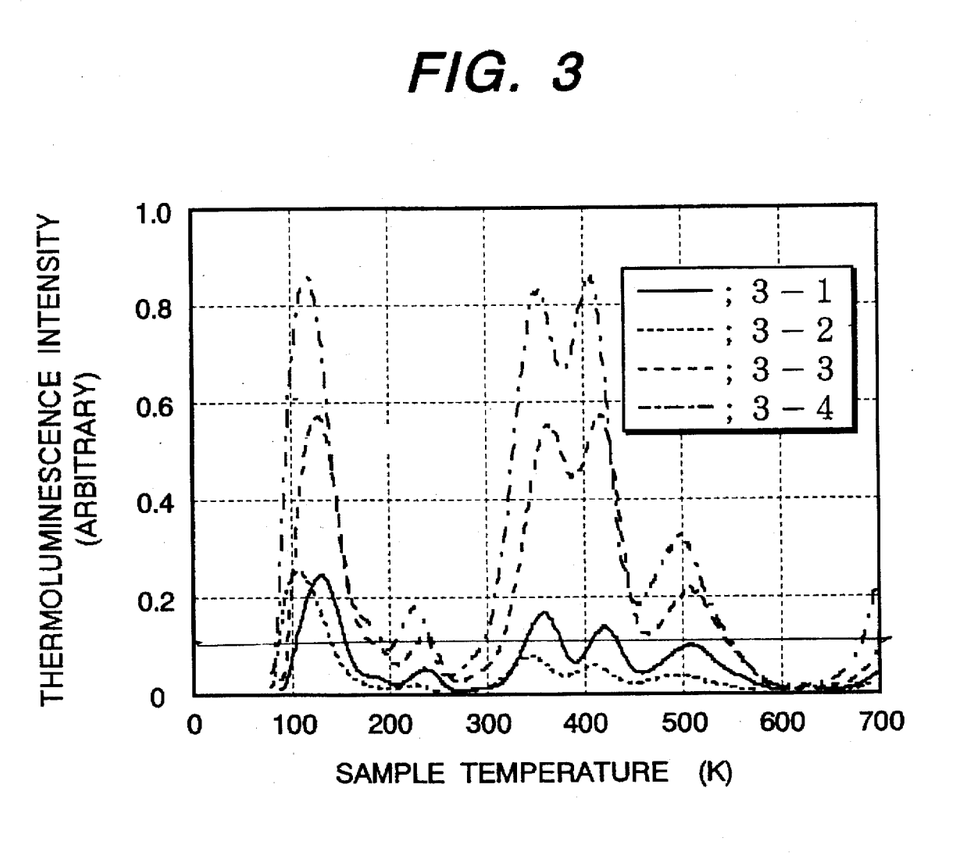
FIG. 3 shows graphs showing the temperature dependency of the thermoluminescence intensity (glow curves) of phosphors which are heat-treated in different atmospheres at high temperature.

Next, results when phosphor samples of the reference example are heat-treated in an $O_2$ current (oxidizing atmosphere), in the air, in an Ar gas current (neutral atmosphere), and in an $H_2$ current (reducing atmosphere) which is diluted to 4% by $N_2$, at 1250° C. for 2 hours and glow curves are measured are shown in FIG. 3. As to the thermoluminescence intensity of the sample 3-2 treated in an oxidizing atmosphere, the density of a deep trap which is generated at more than the room temperature is reduced compared with the sample 3-1 which is not treated. In the sample treated in the air, it is ascertained (not shown in the drawing) that the trap density is reduced slightly though not so much as in the treatment in the oxidizing atmosphere. Inversely, in the sample 3-3 treated in an Ar gas atmosphere which is a neutral atmosphere, the thermoluminescence intensity observed at more than the room temperature is increased and in the sample 3-4 treated in a reducing atmosphere, a stronger thermoluminescence is observed. As a result of this, it is inferred that an electron trap observed at more than the room temperature is an oxygen hole on the surface of the phosphor or a substance which takes part deeply in it.

Next, the operation of the phosphor manufacturing method of the present invention will be explained using $(Y_{1-x}Tb_x)_3(Al_{1-y}Ga_y)_5O_{12}$ as an example.

In the aforementioned phosphor, two elements of Ga and Tb which is an emission center can enter two kinds of ion statuses. Namely, in the case of Ga, not only trivalent $Ga^{3+}$ which exists originally but also monovalent $Ga^+$ exist and in the case of Tb, trivalent $Tb^{3+}$ of luminous ions and also tetravalent $Tb^{4+}$ exist, so that it can be considered fully that these ions coexist also in the phosphor. Therefore, when a phosphor is composed simply in an oxidizing atmosphere, Ga is apt to become $Ga^{3+}$ in the state of high oxidation number, so that it is convenient. On the other hand, Tb becomes $Tb^{4+}$, so that it is extremely unsuitable for the $Tb^{3+}$ doped status which is necessary originally. Namely, it is necessary to realize $Tb^{3+}$ in the state of low oxidation number on one side and $Ga^{3+}$ in the state of high oxidation number on the other side at the same time. Therefore, one of the phosphor manufacturing methods of the present invention is a method for synthesizing a phosphor by oxidizing the material under the condition that the emission center will not become $Tb^{4+}$, that is, in the air at 1400° to 1600° C. and then mending the portion of $Ga^+$ to $Ga^{3+}$ in an oxidizing atmosphere, that is, in an oxygen atmosphere at 1000° to 1400° C. The other is a method for fully composing only a phosphor matrix which does not contain Tb which is an emission center in an oxidation atmosphere, that is, an oxygen atmosphere at 1400° to 1600° C. first and then adding a material of Tb and heat-treating in the air at 1400° to 1600° C. and doping Tb in the phosphor crystal by thermal diffusion. By the two methods, the phosphor of the present invention can be manufactured easily. Each of the two manufacturing methods shows the superior effect of the present invention. However, the effect of the former is greater though very slightly.

DESCRIPTION OF THE PREFERRED EMBODIMENTS

Embodiments 1 to 42

Materials of $Y_2O_3$, $Tb_4O_7$, $Al_2O_3$, and $Ga_2O_3$ are weighed in the predetermined weight respectively, and $BaF_2$ of 0.2 wt % is added to them as flux, and they are mixed thoroughly in an agate mortar. Thereafter, they are put into an alumina crucible and subjected to solid reaction in the air at 1550° C. for two hours firstly. The reaction is expressed by the following formula (3). The materials used this reaction are all 99.999% or more in purity. After cooling, the product in the crucible is transferred to the agate mortar and crushed to pieces lightly and then the obtained product is treated with a $HNO_3$ water solution of about 10 wt % so as to remove the flux. There are no restrictions on the flux removal method and another method may be used. There are various known methods. Next, the product is treated in an oxygen current ($O_2$: 500 ml/min) at about 1250° C. for 2 hours.

$$3\{(1-x)Y_2O_3+x/2Tb_4O_7\}+5\{(1-y)Al_2O_3+yGa_2O_3\} \rightarrow 2(Y_{1-x}Tb_x)_3((Al_{1-y}Ga_y)_5O_{12} \quad (3)$$

After cooling, to remove flux more sufficiently, the product which is obtained again is treated in a $HNO_3$ water solution of about 10 wt % and dried at 120° C. finally. The phosphor which is obtained in this way has a composition of $(Y_{1-x}Tb_x)_3((Al_{1-y}Ga_y)_5O_{12}$ shown in Formula (3) indicated above, is powder with a mean particle diameter in volume (hereinafter referred to as a mean particle diameter) of about 7 to 13 μm, and is ascertained by X-ray diffraction that it is single-crystal powder. The crystal structure is a garnet structure.

Each sample is uniformly coated on a nickel-plated oxygen free copper substrate by coagulating sedimentation using water glass in the same way as with production of a projection tube and the coated substrate is used as a test piece for evaluating the light emitting characteristic thereof. For measurement of a glow curve, the temperature of a phosphor film is an important measurement parameter, so that it is desirable to use a substrate material having a good thermal conductivity and oxygen free copper is used in this embodiment.

An electron beam at an acceleration voltage of 30 kV and a current of 0.05 mA is irradiated to each sample at the room temperature and the brightness of each sample is compared. The irradiation area is 10×10 $mm^2$. As an acceleration test for luminous degradation, an electron beam is irradiated for one hour at the same acceleration voltage and area as those mentioned above and at a current of 0.2 mA and a sample temperature of 200° C. and the ratio of brightness before and after irradiation is obtained and set as a luminous efficiency ratio (maintenance factor).

A phosphor $(Y_{1-x}Tb_x)_3((Al_{1-y}Ga_y)_5O_{12}$ having several y values is synthesized by changing the Tb content x of the emission center and the brightness and maintenance factor of each of the obtained phosphors are shown in Tables 1 and 2. The samples of the reference examples which are shown in Tables 1 and 2 together with the embodiments are phosphors which are added with $BaF_2$ of 0.2 wt % as flux and only synthesized in the air at 1550° C. for about 2 hours. The mean particle diameter in volume of each embodiment is not stated in the tables. However, for example, the mean particle diameter of Embodiment 18 is about 12 μm and there is a tendency that as the ratio of Ga in the composition increases, the mean particle diameter increases and when the ratio of Tb increases, the mean particle diameter increases slightly.

TABLE 1

| Embodiment | x | y | Relative brightness | Maintenance factor |
|---|---|---|---|---|
| 1 | 0.005 | 0 | 0.80 | 1.02 |
| 2 | 0.01 | 0 | 0.89 | 1.03 |
| 3 | 0.03 | 0 | 0.97 | 1.02 |
| 4 | 0.07 | 0 | 1.01 | 1.03 |
| 5 | 0.10 | 0 | 1.01 | 1.03 |
| 6 | 0.15 | 0 | 0.99 | 1.02 |
| 7 | 0.20 | 0 | 0.98 | 1.03 |
| Reference example 1 | 0.07 | 0 | 1 | 1 |
| 8 | 0.005 | 0.2 | 0.95 | 0.97 |
| 9 | 0.01 | 0.2 | 1.03 | 0.99 |
| 10 | 0.03 | 0.2 | 1.10 | 0.98 |
| 11 | 0.07 | 0.2 | 1.15 | 1.01 |
| 12 | 0.10 | 0.2 | 1.14 | 0.99 |
| 13 | 0.15 | 0.2 | 1.10 | 1.01 |
| 14 | 0.20 | 0.2 | 1.08 | 0.99 |
| Reference example 2 | 0.07 | 0.2 | 1.10 | 0.97 |
| 15 | 0.005 | 0.4 | 1.07 | 0.97 |
| 16 | 0.01 | 0.4 | 1.15 | 0.98 |
| 17 | 0.03 | 0.4 | 1.23 | 0.99 |
| 18 | 0.07 | 0.4 | 1.30 | 1.02 |
| 19 | 0.10 | 0.4 | 1.28 | 1.00 |
| 20 | 0.15 | 0.4 | 1.22 | 0.99 |
| 21 | 0.20 | 0.4 | 1.18 | 0.99 |
| Reference example 3 | 0.07 | 0.4 | 1.22 | 0.95 |

TABLE 2

| Embodiment | x | y | Relative brightness | Maintenance factor |
|---|---|---|---|---|
| 22 | 0.005 | 0.6 | 1.05 | 0.94 |
| 23 | 0.01 | 0.6 | 1.13 | 0.96 |
| 24 | 0.03 | 0.6 | 1.22 | 0.95 |
| 25 | 0.07 | 0.6 | 1.29 | 0.97 |
| 26 | 0.10 | 0.6 | 1.26 | 0.96 |
| 27 | 0.15 | 0.6 | 1.21 | 0.94 |
| 28 | 0.20 | 0.6 | 1.15 | 0.95 |
| Reference example 4 | 0.07 | 0.6 | 1.21 | 0.92 |
| 29 | 0.005 | 0.8 | 0.90 | 0.91 |
| 30 | 0.01 | 0.8 | 0.97 | 0.91 |
| 31 | 0.03 | 0.8 | 1.03 | 0.92 |
| 32 | 0.07 | 0.8 | 1.06 | 0.92 |
| 33 | 0.10 | 0.8 | 1.04 | 0.92 |
| 34 | 0.15 | 0.8 | 0.99 | 0.91 |
| 35 | 0.20 | 0.8 | 0.95 | 0.92 |
| Reference example 5 | 0.07 | 0.8 | 1.02 | 0.89 |
| 36 | 0.005 | 1 | 0.71 | 0.85 |
| 37 | 0.01 | 1 | 0.78 | 0.86 |
| 38 | 0.03 | 1 | 0.83 | 0.87 |
| 39 | 0.07 | 1 | 0.85 | 0.87 |
| 40 | 0.10 | 1 | 0.83 | 0.86 |
| 41 | 0.15 | 1 | 0.77 | 0.86 |
| 42 | 0.20 | 1 | 0.72 | 0.87 |
| Reference example 6 | 0.07 | 1 | 0.82 | 0.84 |

Tables 1 and 2 show that the samples of the same Tb content among the aforementioned series of samples processed in an oxidizing atmosphere are superior to the untreated reference examples in the characteristics of brightness and life. A glow curve of a sample to which an electron beam is not irradiated as described in Embodiment 18 is shown in FIG. 1. To check the effect of the oxidizing heat treatment, the result of the sample of the reference example 3 which is measured under the same conditions is also shown in the drawing. The measurement conditions are the same as those mentioned above (in the item of operation). The thermoluminescence peak at less than 200K varies little, though it can be ascertained that in the temperature range above the room temperature, the thermoluminescence intensity reduces remarkably by the oxidizing heat treatment. Namely, it indicates that there is little trap of a deep energy level equivalent to this temperature range. In this case, the integrated intensity of the thermoluminescence peak within a temperature range from 300K to 700K is less than 1/1000 of the integrated intensity of the thermoluminescence peak within a temperature range of less than 300K.

Furthermore, the results when glow curves are measured for the samples after measurement of the maintenance factor (namely after the samples are forcibly degraded) are shown in FIG. 2. Particularly in the reference example 3, a new peak is clearly observed near 490K. It is considered to be a color center which is formed in the phosphor crystal by irradiation of an electron beam. In the sample of Embodiment 18, the integrated intensity of the thermoluminescence belonging to this color center is extremely smaller than that of the reference example 3. It is found that the oxidation heat treatment is considerably effective in improvement of the luminous life.

Embodiments 43 to 48

In the same way as with the aforementioned embodiments 1 to 42, high-purity materials of $Y_2O_3$, $Al_2O_3$, and $Ga_2O_3$ are weighed in the predetermined weight respectively, and $BaF_2$ flux of 0.2 wt % is added to them, and they are mixed thoroughly in an agate mortar. Thereafter, they are put into an alumina crucible and subjected to solid reaction in an oxygen current at 1550° C. for two hours. The product obtained in this way has a composition of $Y_3(Al_{1-y}Ga_y)_5O_{12}$. The product in the crucible is transferred to the agate mortar and crushed to pieces lightly, and $Tb_4O_7$ is added to it so that the emission center density, that is, the Tb amount becomes 7 mol %, and the emission center is diffused in the air at about 1550° C. for 2 hours, and then the product is cooled, and the obtained product is treated with a $HNO_3$ water solution of about 10 wt % so as to remove the flux and dried at 120° C. finally.

The phosphor obtained in this way has a composition of almost $(Y_{0.93}Tb_{0.07})_3(Al_{1-y}Ga_y)_5O_{12}$ and is powder with mean particle diameter of about 10 μm and it is ascertained by X-ray diffraction that the product is a single crystal powder. The crystal structure is a garnet structure. Each sample is coated on a substrate in the same way as with the aforementioned embodiment and the brightness and luminous life by irradiation of an electron beam, that is, the maintenance factor is evaluated. The results are shown in Table 3.

TABLE 3

| Embodiment | y | Relative brightness | Maintenance factor |
|---|---|---|---|
| 43 | 0 | 1.02 | 1.02 |
| 44 | 0.2 | 1.17 | 1.01 |
| 45 | 0.4 | 1.30 | 0.99 |
| 46 | 0.6 | 1.28 | 0.96 |
| 47 | 0.8 | 1.08 | 0.94 |
| 48 | 1 | 0.85 | 0.86 |

When the embodiments shown in Table 3 and Reference examples 1 to 6 shown in Tables 1 and 2 are compared under the condition of the same content of Ga (for example, Embodiment 45 is compared with Reference example 3), it is found that as shown in this embodiment, even in a sample which is obtained by constituting the phosphor matrix securely in an oxidizing atmosphere first and then thermally diffusing Tb of the emission center, the characteristics of brightness and life are superior.

Embodiments 49 to 54

The phosphor obtained by Embodiments 43 to 48 mentioned above is applied to the phosphor film of a projection tube. For this comparison, the phosphor obtained by Reference example 3 is also evaluated as a phosphor film of a projection tube. This phosphor film is formed so that the screen weight becomes about 6 mg/cm² by the coagulating sedimentation method using water glass as a binder which is most generally used to manufacture a projection tube.

Figure 4:
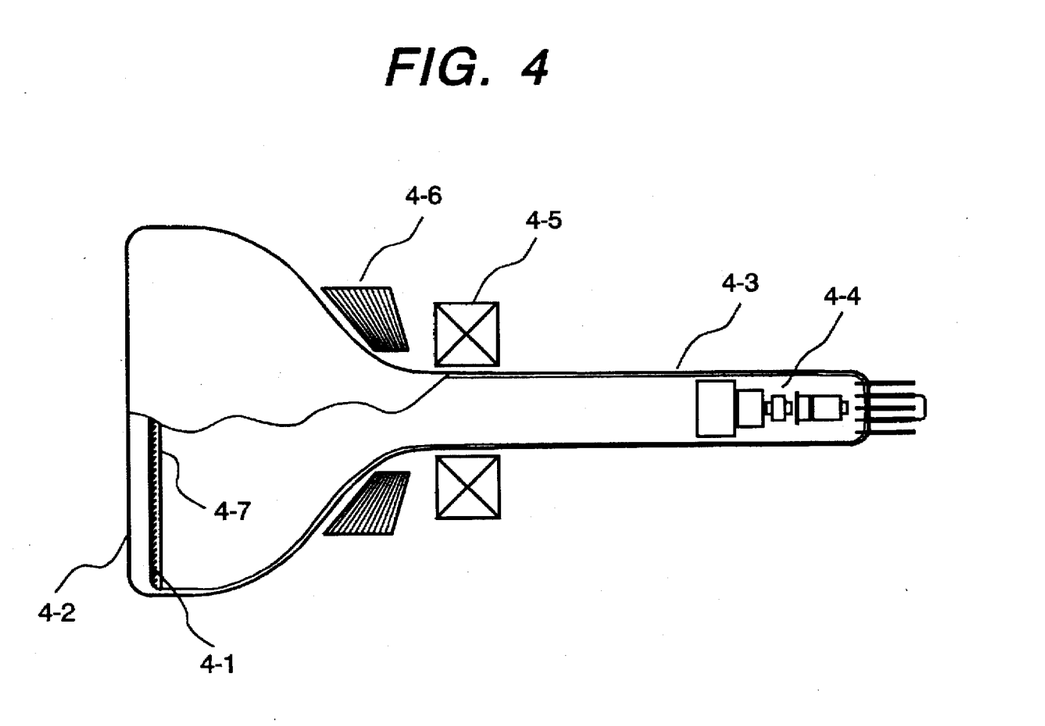
FIG. 4 is a schematic sectional view showing the projection tube of the present invention.

A schematic view of the cross section of a projection tube is shown in FIG. 4. A phosphor film 4-1 is formed on a face plate 4-2. An electron beam emitted from an electron gun 4-4 in a neck tube 4-3 is focused by a focus coil 4-5 and deflected by a deflection yoke 4-6 according to picture scanning lines. The electron beam excites the phosphor through an aluminum deposited film 4-7. The electron beam diameter on the phosphor film varies with the position and current and is about 0.1 to 0.5 mm. The brightness of the projection tube is measured at an acceleration voltage of 30 kV, an irradiation current of 0.6 mA, and an irradiation area of 5 inch (76 mm×102 mm) first. The scanning conditions of an electron beam are a horizontal frequency of 15.5 kHz and a vertical frequency of 60 Hz in the same way as with TV pictures of the NTSC system. The brightness is expressed by the relative value which is standardized by the value of Reference example 7. The luminous life is evaluated by a ratio to the initial brightness (brightness maintenance factor) after continuous irradiation for 2000 hours under the aforementioned conditions. The results are shown in Table 4.

TABLE 4

| Embodiment | y | Relative brightness | Maintenance factor |
|---|---|---|---|
| 49 | 0 | 0.96 | 0.92 |
| 50 | 0.2 | 1.02 | 0.85 |
| 51 | 0.4 | 1.10 | 0.83 |
| 52 | 0.6 | 1.08 | 0.82 |
| 53 | 0.8 | 1.01 | 0.80 |
| 54 | 1 | 0.89 | 0.78 |
| Reference example 7 | 0.4 | 1 | 0.76 |

In the same way as with the results in Table 3, Table 4 shows that the luminous life of a series of samples is superior to that of reference example 7. When Embodiment 51 is compared with reference example under the condition of the same content of Ga (0.4), the effect of improvement of the characteristics such as 10% in brightness and about 9% in brightness maintenance factor can be ascertained.

Embodiments 55 to 57

The mean particle diameter of each phosphor obtained under the same composition and composition conditions as those of Embodiment 18 mentioned above is about 12 μm. Each phosphor is subjected to ball milling for several hours to tens of hours using alumina balls 3 to 5 mm in diameter. The number of revolutions of the mill pot is about 60 rpm. Each sample which is finely crushed is added with $BaF_2$ of 0.2 mol % again and heat-treated in an oxygen current (flow rate: 500 ml/min) at 1250° C. for 2 hours. After cooling, it is put through a sieve and washed with a $HNO_3$ water solution of about 10 wt % about three times. The mean particle diameter of the phosphors which are obtained in this way is about 5 μm.

Each system in which this phosphor with a mean particle diameter of 5 μm and the phosphor with a mean particle diameter of 12 μm obtained in Embodiment 18 are mixed at a mixing ratio of 50 wt %:50 wt % and 70 wt %:30 wt % is formed on a nickel-plated oxygen free copper substrate by the known slurry method using polyvinyl alcohol and ammoniam dichromate so that the weight of the phosphor film becomes about 5 mg/cm². The light emitting characteristic of each phosphor film is evaluated under the same condition as that described in Embodiments 1 to 42. The current factor γ shown in the relative equation (C is a constant) of the irradiation current I and the luminescence intensity L expressed by Formula (4) indicated below is also evaluated. In this case, the current factor at an irradiation current of 0.05 mA is used for comparison.

$$L = C \cdot I^\gamma \quad (4)$$

TABLE 5

| Embodiment | Particle diameter μm | Filling density g/cm³ | Relative brightness | Current factor γ | Maintenance factor |
|---|---|---|---|---|---|
| 55 | 5 | 2.1 | 1.31 | 0.91 | 1.02 |
| 56 | 5 + 12 1:1 | 2.4 | 1.33 | 0.92 | 1.03 |
| 57 | 5 + 12 7:3 | 2.5 | 1.34 | 0.92 | 1.05 |
| 18 | 12 | 2.1 | 1.30 | 0.91 | 1.02 |

In Embodiment 55, a phosphor of small particles having the characteristics of brightness, current factor, and luminous life on the same level as that of Embodiment 18 mentioned above is obtained. In the phosphor film (Embodiments 56 and 57) which is produced by mixing the aforementioned phosphor with the sample obtained in Embodiment 18, further improvement in the light emitting characteristic is observed. Particularly, since the filling density can be increased, it is found to be effective in improvement of the luminous life (maintenance factor).

In each embodiment mentioned above, the phosphor of a system of a composition of $(Y_{1-x}Tb_x)_3((Al_{1-y}Ga_y)_5O_{12}$ is described. However, also in a phosphor in which Tb of the emission center is replaced with Ce, almost the same effect is recognized.

Effects of the Invention

In the green phosphor obtained by the present invention, compared with a conventional phosphor having the same composition, the luminous life is improved due to high density excitation and the luminous efficiency is increased. By the phosphor manufacturing method of the present invention, such a phosphor can be manufactured easily. Furthermore, in the luminous screen of the present invention, the brightness is increased and the luminous life is improved. As a result, when this material is applied to a cathode-ray tube such as a projection tube in which a phosphor film is used at a high excitation strength, it greatly contributes not only to lengthen the life time of the product but also to improve the picture quality.

What is claimed is:

1. A phosphor comprising yttrium, at least one selected from the group consisting of aluminum and gallium, and oxygen as basic constituting elements, Tb or Ce as an activator, and the garnet structure as a crystal structure, wherein in a curve showing the temperature dependency of the thermoluminescence intensity, the integrated intensity of the thermoluminescence peak in the temperature range from 300K to 700K is at most 1/100 of the integrated intensity of the thermoluminescence peak in the temperature range of less than 300K.

2. A phosphor according to claim 1, wherein an emission center of said phosphor is terbium ions.

3. A phosphor expressed by a general formula $(Y_{1-x}O_x)_3(Al_{1-y}Ga_y)_5O_{12}$ (x is a value within a range of $0.01 \leq x \leq 0.15$ and y is a value within a range of $0 \leq y \leq 1$), O is Tb or Ce, wherein in a curve showing the temperature dependency of the thermoluminescence intensity, the integrated intensity of the thermoluminescence peak in the temperature range from 300K to 700K is at most 1/100 or the integrated intensity of the thermoluminescence peak in the temperature range of less than 300K.

4. A method for manufacturing a phosphor having Y, Al, and Ga and containing Tb or Ce as an activator, comprising a step of heating in an oxidizing atmosphere at a temperature within a range of 1400°–1600° C. for 1–3 hours to incorporate Ga as $Ga^{3+}$, and a step of heating in air at a temperature within a range of 1000° to 1600° C. for 1–3 hours to incorporate Tb or Ce as $Tb^{3+}$ or $Ce^{3+}$.

5. A method for manufacturing a phosphor according to claim 4, wherein said method comprises a first step of oxidizing raw materials for forming a phosphor containing yttrium, aluminum and gallium, and terbium or cerium, together with flux, at a temperature within a range of 1400°–1600° C., a second step of removing said flux, so as to obtain a product, and a third step of oxidizing the obtained product under the condition that monovalent gallium is oxidized to trivalent gallium, at a temperature within a range of 1000° to 1400° C.

6. A method for manufacturing a phosphor according to claim 5, wherein said first step oxidizes a phosphor in the air at a temperature within a range from 1500° to 1600° C.

7. A method for manufacturing a phosphor according to claim 5 or 6, wherein said third step oxidizes a phosphor in an oxygen atmosphere at a temperature within a range from 1200° to 1300° C.

8. A method for manufacturing a phosphor according to claim 4, wherein said method comprises a first step of oxidizing raw materials for forming a phosphor containing yttrium, aluminum and gallium), and terbium or cerium, together with flux, at a temperature within a range of 1400° to 1600° C., a second step of removing said flux, so as to obtain a product, and a third step of oxidizing the obtained product, at a temperature within a range of 1000° to 1400° C., so as to reduce the defect level in the phosphor.

9. A method for manufacturing a phosphor according to claim 8, wherein said first step oxidizes a phosphor in the air at a temperature within a range from 1500° to 1600° C.

10. A method for manufacturing a phosphor according to claim 8 or 9, wherein said third step oxidizes a phosphor in an oxygen atmosphere at a temperature within a range from 1200° to 1300° C.

11. A method for manufacturing a phosphor according to claim 4, wherein said method comprises a first step of oxidizing raw materials for forming a phosphor expressed by a general formula $(Y_{1-x}Tb_x)_3((Al_{1-y}Ga_y)_5O_{12}$ (x is a value within a range of $0.01 \leq x \leq 0.15$ and y is a value within a range of $0<y<1$), together with flux, in the air at a temperature within a range from 1400° to 1600° C. a second step of removing said flux, so as to obtain a product, and a third step of oxidizing the obtained product in an oxygen atmosphere at a temperature within a range from 1000° to 1400° C.

12. A method for manufacturing a phosphor according to claim 11, wherein said first step oxidizes a phosphor in the air at a temperature within a range from 1500° to 1600° C.

13. A method for manufacturing a phosphor according to claim 11 or 12, wherein said third step oxidizes a phosphor in an oxygen atmosphere at a temperature within a range from 1200° to 1300° C.

14. A method for manufacturing a phosphor according to claim 4, wherein said method oxidizes raw materials for forming a phosphor containing yttrium and aluminum and gallium, together with flux, at a temperature within a range of 1400°–1600° C., so as to obtain a product, adds a material of an element which will be an emission center to the obtained product, and heat-treats them so as remove said flux.

15. A method for manufacturing a phosphor according to claim 14, wherein said oxidation is executed in an oxygen atmosphere at a temperature within a range from 1500° to 1600° C.

16. A method for manufacturing a phosphor according to claim 14 or 15, wherein said heat treatment is executed in the air at a temperature within a range from 1400° to 1600° C.

17. A method for manufacturing a phosphor according to claim 16, wherein said heat treatment is executed in the air at a temperature within a range from 1500° to 1600° C.

18. A method for manufacturing a phosphor according to claim 14 or 15, wherein said emission center is terbium ions.

19. A method for manufacturing a phosphor according to claim 4, wherein said method oxidizes raw materials Y, Al, and Ga for forming a phosphor expressed by a general formula $(Y_{1-x}Tb_x)_3(Al_{1-y}Ga_y)_5O_{12}$ (x is a value within a range of $0.01 \leq x \leq 0.15$ and y is a value within a range of $0<y<1$), together with flux, in an oxygen atmosphere at a temperature within a range from 1400° to 1600° C. so as to obtain a product, adds a material of Tb to the obtained product, and heat-treats them in the air at a temperature within a range from 1400° to 1600° C. so as remove said flux.

20. A method for manufacturing a phosphor according to claim 19, wherein said oxidation is executed in an oxygen atmosphere at a temperature within a range from 1500° to 1600° C.

21. A method for manufacturing a phosphor according to claim 19 or 20, wherein said heat treatment is executed in the air at a temperature within a range from 1500° to 1600° C.

22. A method for manufacturing a phosphor according to any one of claim 5, 8, 11, 14 and 19, wherein said raw materials are oxide materials for forming the phosphor.

23. A method for manufacturing a phosphor having Y, at least one selected from the group consisting of Al and Ga, and Tb or Ce as activator, comprising the steps of oxidizing raw materials for forming the phosphor having Y, at least one selected from the group consisting of Al and Ga, and Tb or Ce as activator, together with a flux, at a temperature in a range from 1400° to 1600° C.; removing the flux, so as to obtain a product; and oxidizing the obtained product so as to reduce a defect level in the phosphor.

24. A method for manufacturing a phosphor according to claim 23, wherein said phosphor includes Ga, and said oxidizing to reduce the defect level oxidizes monovalent gallium to trivalent gallium.

25. A method for manufacturing a phosphor according to claim 24, wherein the step of oxidizing the obtained product is performed at a temperature within a range of 1000° to 1400° C.

26. A method for manufacturing a phosphor according to claim 25, wherein said phosphor also includes Al.

27. A method for manufacturing a phosphor having y and at least one selected from the group consisting of Al and Ga, comprising the step of oxidizing raw materials of said phosphor having Y and at least one of Al and Ga, together with a flux, at a temperature in a range of 1400° to 1600° C.; adding a material selected from the group consisting of Tb and Ce and acting as an emission center in the phosphor; and heat-treating so as to remove the flux.

28. A method for manufacturing a phosphor according to claim 27, wherein said heat-treating is performed at a temperature in a range of 1400° to 1600° C. in air.

29. A method for manufacturing a phosphor having at least Y and Ga, and containing Tb or Ce as an activator, comprising a step of heating in an oxidizing atmosphere at a temperature within a range of 1400°–1600° C. to incorporate Ga as $Ga^{+3}$, and a step of heating in air at a temperature within a range of 1000°–1600° C. to incorporate Tb or Ce as $Tb^{+3}$ or $Ce^{+3}$.

30. A cathode-ray tube comprising a luminous screen having a phosphor film using the phosphor stated in any one of claims 2 or 3 which is installed on a face plate and an electron gun for emitting electrons so as to excite the phosphor of said luminous screen.

31. A cathode-ray tube according to claim 30, wherein said phosphor is a mixture of a phosphor with a mean particle diameter in volume of 2 to 5 μm and a phosphor with a mean particle diameter in volume of 9 to 15 μm.

32. A cathode-ray tube according to claim 30, wherein the filling density of said luminous screen is within a range from 2.2 to 3.0 g/cm$^3$.

33. A cathode-ray tube according to claim 31, wherein the filling density of said luminous screen is within a range of 2.2 to 3.0 g/cm$^3$.

* * * * *